United States Patent Office 2,837,415
Patented June 3, 1958

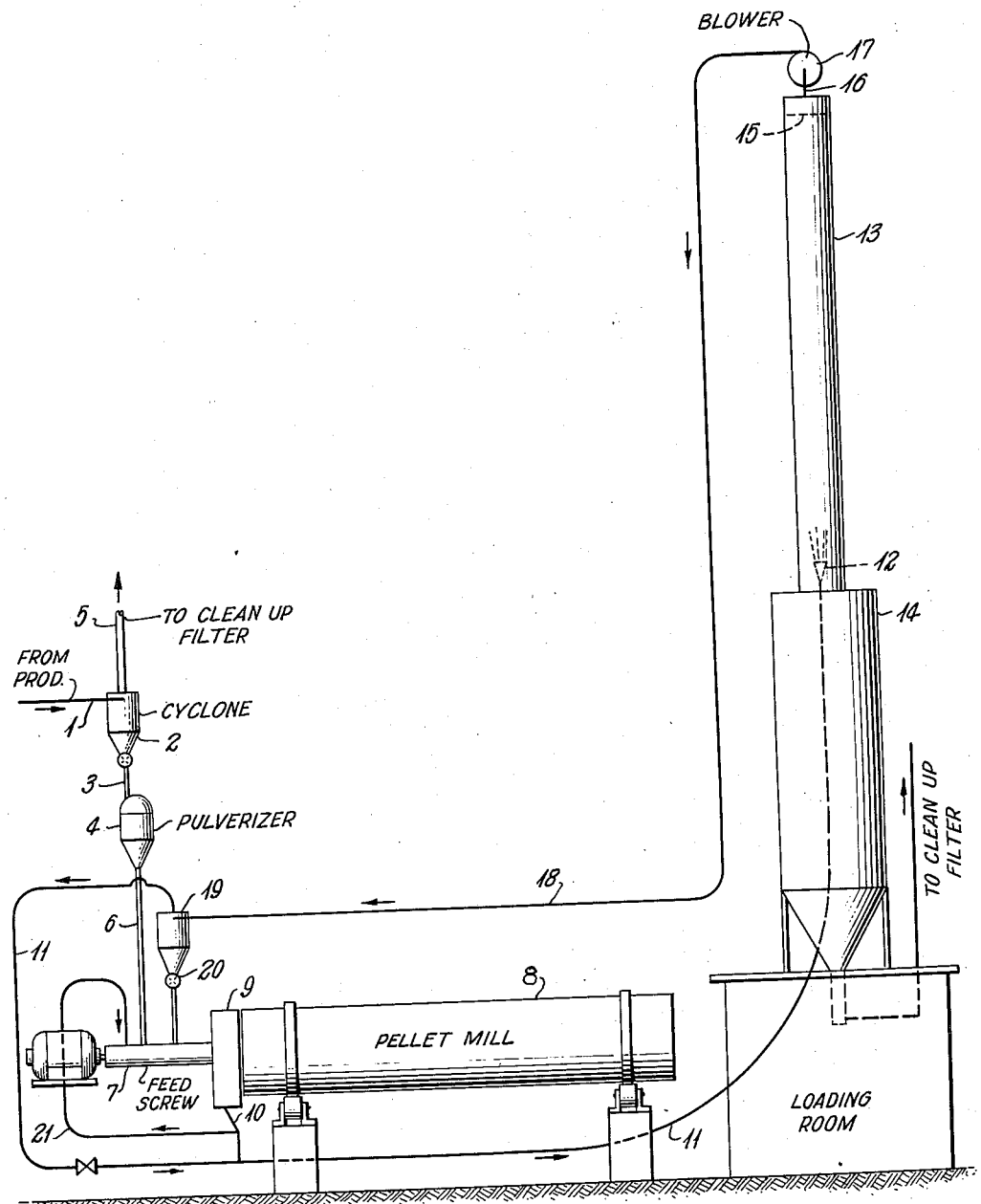

2,837,415
GAS LIFTING CARBON BLACK PELLETS

William R. King, Bartlesville, Okla., and George J. Webster, Borger, Tex., assignors to Phillips Petroleum Company, a corporation of Delaware Application March 29, 1954, Serial No. 419,234

6 Claims. (Cl. 23—314)

This invention relates to a gas lift and disengaging device for carbon black pellets.

Carbon black is extremely fine and difficult to contain. For that reason, it is generally pelletized before packaging for shipment. Carbon black, as produced in a carbon black furnace by the incomplete combustion of hydrocarbons, such as a heavy oil, natural gas or any other combustible carbon containing material is carried by the combustion gases to a collection system wherein the carbon black is separated from the gases. The thus separated black passes to revolving elongated horizontal cylinders wherein the black is caused to agglomerate or form pellets. It has been found that the carbon black will agglomerate more readily in the presence of already formed pellets and for that reason the practice, in many cases, is to recirculate a portion of the mill discharge back to its feed end. The remaining pellets are then conveyed to storage bins from whence the black is withdrawn for packaging or shipping. These bins are generally very tall being supported over tracks for loading hopper cars, etc. It is therefore often necessary to elevate the finished pellets to a considerable height for storage and subsequent loading into hopper cars or cartons.

Because of the friable nature of the pellets conventional elevators are very injurious to their quality. Bucket or other mechanical elevators cause a considerable number of the pellets to break down to dust and thereby nullifying the advantages gained by pelletizing. Zipper belt elevators can, in part, overcome this shortcoming but because of their construction fail rapidly under the high heat of the pellets. All of the conventional elevators and especially the zipper belt type require relatively high investment.

Pneumatic conveyor systems are also used for conveying carbon black pellets and are, in general, comparatively inexpensive to install and operate. The big disadvantage in conveying carbon black by means of pneumatic conveyors is that the pellets are easily broken upon being disengaged from the conveying gas. That is, the stream of pellets and gas will enter an enlarged section where the stream impinges upon the walls of the enlarged vessel and the gas stream is slowed down. The contact between the vessel wall and the pellets causes the pellets to fracture.

An object of our invention is to provide a simple and inexpensive apparatus for elevating carbon black pellets. Another object of our invention is to provide an apparatus or device incorporated in a pneumatic conveyor to separate carbon black pellets from the conveying gas without cracking the said pellets. Still other objects will be apparent to those skilled in the art upon reading the disclosure and the attached claims.

The device of our invention incorporates a pneumatic conveyor having a unique means for gently decelerating rapidly moving pellets under controlled conditions which will largely eliminate the pellet breakage usually associated with pneumatic conveyors. Another unique feature involves an elutriation section which will remove any dust and fragments that are formed and deposit the dustless, unbroken pellets of a preselected minimum size into the storage hopper.

The primary elevating mechanism is a pneumatic conveyor of standard design which discharges vertically into a relatively large vertical tube which is located on top of the storage hopper. The height of the vertical tube is such that the momentum of the pellets of larger than a desired predetermined size is insufficient to carry them to the top and the diameter is such that the upward gas velocity will convey the dust and pellets below a predetermined minimum size out the discharge opening at the top but will at the same time permit the pellets larger than the minimum size to decelerate, reverse and fall back into the storage tank under the disengaging chamber. Inasmuch as only the force of gravity and the frictional drag of the gas acts upon the pellets they will be slowed so gently that they will not fracture when disengaged from the gas stream. This eliminates the major source of breakage usually found in pneumatic systems. The dust and small pellets are carried out the top of the elutriation section and are collected in a cyclone for returning to the pellet mills. The conveying gas is returned to the pickup point and is reused. By recirculating the smaller pellets, the necessity for returning finished pellets to the pelleting mill is largely eliminated.

Other features of our invention which contribute to the ease and efficiency of operation include; a flare on the end of the pneumatic conveyor pipe to break up the jet action of the escaping gas and to distribute it over the cross section of the disengaging tube (elutriation section) and a perforated plate near the top of the disengaging tube which prevents the funneling of the gas into the exit conduit thereby increasing its velocity and interferring with the disengaging action. Other advantages and features will be apparent upon reading this disclosure.

We will further describe our invention by referring to the attached drawing which is a schematic representation of our invention as used in connection with a conventional pelleting mill and wherein we will use air as the gas.

Referring to the figure, carbon black from the production system is passed via conduit 1 to cyclone 2 where most of the carbon black is separated from the conveying air and settles via conduit 3 to pulverizer 4. The air containing carbon black dust passes via conduit 5 to carbon black clean up filters not shown. Any carbon black agglomerates are thoroughly broken up in the pulverizer. The pulverized carbon black passes via conduit 6 to feed screw 7 from whence it is fed to pellet mill 8. The pellet mill rotates and thereby causes the carbon black to agglomerate into small pellets. These pellets pass to discharge zone 9 and are discharged through conduit 10 to pneumatic conveyor 11. Air being blown through the pneumatic conveyor 11 picks up carbon black from conduit 10 and conveys it up through storage bin 14 and discharges it through a flared head 12 into disengaging tube 13. The diameter of the disengaging tube is sufficiently larger than that of the pneumatic conveyor so that the air velocity is greatly reduced. The gravitation force and air drag acting on the pellets helps overcome the momentum and ascending air forces causing the pellets to cease rising. Gravity then starts them falling against the ascending air current. The gravitating pellets will gently descend to storage bin 14. Perforated plate 15 is provided to prevent channeling of the air currents and make for more efficient disengagement of the pellets from the air. The smaller pellets and dust will be entrained in the ascending air and be carried through plate 15 and out of the disengaging tube via conduit 16 to blower 17. The air containing the undersized carbon black pellets and dust is blown to cyclone separator 19 via conduit 18. Most of the carbon black will be separated out and fed back to the feed screw 7 via star valve 20. The air containing some carbon black dust will be recirculated to conduit 11 and picks up additional pellets as hereinbefore described. Conduit 21 is optional and can be used to circulate pellets from conduit 10 to the feed screw if it is so desired.

As has been indicated, the size of the equipment will be dependent upon the production rate, desired pellet size, etc., and the proper design is well within the skill of the art. However, to further illustrate our invention, the following example is given where approximately 2000 pounds of carbon black is being pelletized per hour.

Approximately 2000 pounds per hour of pulverized carbon black is fed by means of feed screw 7 to an 8 foot diameter by 48 foot long pellet mill. The pneumatic conveyor has a 4" inside diameter and the feed discharge pipe 10 has a 6" inside diameter. The pneumatic conveyor is circulating 900 cubic feet per minute of air at approximately 100° F. This is equivalent to about 10,000 feet per minute velocity. Approximately 50% of the feed carbon black is recirculated so that the air will be carrying fifty pounds of black per 900 cubic feet of air. The disengaging tube 13 has a diameter of 40" and is 40 feet tall which would mean the velocity of the 900 cubic feet of air is about 100 feet per minute. The perforated plate 15 is located 1½ feet below the top of the disengaging tube and is perforated with 4" diameter holes. The fan of blower 17 is capable of moving 900 cubic feet of dust laden air per minute and the return conduit 18 has a 6" diameter. The separator 19 is an 18" diameter cyclone. As was hereinbefore said, for each 2000 pounds of feed, one thousand pounds of carbon black will be recirculated to the pellet mill via conduit 18. This amount of recirculation conforms to present practice where the recirculating carbon black would pass through conduit 21. By the use of circulating conduit 21, the amount of material being lifted and recirculated via conduit 18 can be materially decreased. In the described example, the carbon black pellets separated from the gasiform (air) stream in zone 13 is substantially all retained on a 60 mesh screen and substantially all of the black circulating with the gasiform stream to separator 19 via conduit 18 will pass said 60 mesh screen.

We have illustrated our invention in one of its preferred embodiments. It will be obvious to those skilled in the art that many modifications can be made without departing from the scope of our invention. For the particular carbon black illustrated, it required 8,000 to 12,000 feet per minute air velocity wherein each 900 feet³ of air carried 50 pounds of black to take the black to the top of the 24 foot bin. Where the disengaging tube had a cross sectional area 100 times that of the pneumatic conveyor and the velocity in the pneumatic conveyor was approximately 10,000 feet per minute, the disengaging tube was 40 feet high. It is obvious that for different carbon black pellets, different production rates and different diameter ratios, the size of the disengaging tube would be modified accordingly. Additional blowers, blower locations, valves, etc. can be utilized as desired.

We claim:

1. A carbon black pelleting and storage apparatus comprising in combination a pellet mill having a feed means and a discharge means; a storage bin; a disengaging tube on top of and communicating freely with the said storage bin; a pneumatic conveyor adapted to receive carbon black from the discharge means of the said pellet mill and for conveying the said carbon black to the bottom of the said disengaging tube; the said penumatic conveyor being flared outwardly at its outlet end so as to distribute said carbon black uniformly upward and over the entire cross sectional area of said disengaging tube; the said outlet end being disposed upward and within the said disengaging tube; the said disengaging tube having a cross sectional area substantially greater than that of the said pneumatic conveyor and being of sufficient height to allow carbon black of a predetermined minimum size to come to rest and reverse its direction gravitating to the said storage bin; means for removing gas and carbon black of less than the said predetermined size from the said disengaging tube; means for separating carbon black from gas; means for passing said removed gas and carbon black to said separator wherein most of the carbon black is separated from the gas; means for passing the thus separated carbon black to the said pellet mill; and means for passing the gas from the said separator to the said pneumatic conveyor.

2. The apparatus of claim 1 wherein the disengaging tube has a perforate plate disposed horizontally and a spaced distance below the gas outlet of the said tube and disposed above the pneumatic conveyor outlet at a sufficient height to allow the carbon black to come to rest without impinging upon the said plate.

3. The apparatus of claim 2 wherein the pneumatic conveyor has a cross section which will require a gas velocity of 8,000 to 12,000 feet per minute when the desired volume of gas and carbon black is conveyed and wherein the cross sectional area of the disengaging tube is at least 100 times that of the pneumatic conveyor.

4. The method of preparing carbon black for transporting which comprises passing carbon black through a pelleting zone wherein pellets of carbon black are formed, withdrawing said pellets from said pelleting zone, suspending said withdrawn pellets in a gasiform stream, passing said stream through a longitudinally extensive zone of restricted cross sectional area at a velocity sufficient to transport said suspended pellets, discharging said stream from said zone of restricted cross sectional area upwardly and uniformly into a longitudinally extensive zone of greater cross sectional area than said zone of restricted cross sectional area wherein the velocity of said stream is reduced and pellets larger than a predetermined size are disengaged from said gasiform stream, withdrawing the disengaged pellets from the bottom of said zone of greater cross sectional area, withdrawing the gasiform stream having suspended therein the rest of the pellets from a region of said zone of greater cross sectional area above the highest level obtained by the disengaged pellets, passing the last said withdrawn stream to a separating zone wherein substantially all of the rest of the said pellets are separated from the gasiform stream, withdrawing separated pellets from the bottom of the separating zone, adding said separated pellets to the carbon black passing through the pelleting zone, withdrawing the gasiform stream from the separating zone, and passing the gasiform stream withdrawn from the separating zone to the zone of restricted cross sectional area wherein pellets are introduced.

5. The method of preparing carbon black for transportation which comprises passing carbon black through a pelleting zone thereby forming pellets, withdrawing said pellets from said pelleting zone, suspending said withdrawn pellets in a gasiform stream, passing said stream through a longitudinally extensive zone of restrictive cross section at a velocity sufficient to transport the suspended carbon black through said zone, elevating the said suspended carbon black in said zone of restricted cross sectional area to a height well above the level of introducing said carbon black to said gasiform stream, discharging said stream from said zone of restricted cross sectional area upwardly and uniformly into a longitudinally extensive zone of greater cross sectional area than said zone of restricted cross sectional area wherein the velocity of said stream is reduced and part of the carbon black is disengaged from said gasiform stream to settle gently toward the bottom of said zone of greater cross sectional area through the ascending gasiform stream, withdrawing the disengaged carbon black from the bottom of said zone of greater cross sectional area, withdrawing the rest of said carbon black suspended in said stream from a region of said zone of greater cross sectional area above the highest level obtained by the disengaged carbon black, blowing the said withdrawn carbon black suspended in said stream to a separation zone, separating substantially all of the still suspended carbon black from the gasiform stream in said separating zone, settling the separated carbon black to the bottom of the said separating zone, withdrawing the gasiform stream from said separating zone, passing the thus withdrawn black free gasiform stream in a longitudinally extensive zone of restricted cross sectional area to the position of introducing the carbon black pellets thereby serving as said gasiform stream, withdrawing the separated carbon black from the bottom of said separating zone, and introducing the last said withdrawn carbon black to the carbon black passing through the pelleting zone.

6. An apparatus for preparing carbon black for shipment which comprises in combination an elongated horizontally disposed rotary hollow cylinder, means for introducing loose carbon black into said cylinder, means for rotating said cylinder thereby pelleting said carbon black, means for transferring pelleted carbon black from said hollow cylinder to a gasiform stream and entraining same in said gasiform stream, a storage vessel supported so as to accommodate railroad freight cars thereunder, an elongated vertical disengaging tube of greater diameter than the cross sectional area of said gasiform stream and of sufficient height to allow ascending pelleted carbon black of a predetermined minimum size to come to rest and to reverse its direction without being impinged against the top of said tube when said gasiform stream is introduced into said elongated tube over its cross sectional area, said elongated tube being of substantially smaller cross sectional area than said storage vessel and being disposed over and freely communicating therewith, means for introducing said gasiform stream into said elongated tube in such a manner that said gasiform stream is introduced in an upward direction over the cross sectional area of said tube, means for withdrawing gasiform stream from said tube above the height of said carbon black pellets come to rest, a solids-gas separator means, means for introducing the gasiform stream withdrawn from said disengaging tube to said separator means, means for withdrawing carbon black solids from said separator means, means for introducing carbon black so withdrawn from said separator means to said horizontally disposed rotary cylinder, means for withdrawing a gasiform stream from said separator means, means for introducing last said gasiform stream to first said gasiform stream, and means for withdrawing pelleted carbon black from said storage vessel.

References Cited in the file of this patent

UNITED STATES PATENTS

| | | |
|---|---|---|
| 2,327,016 | Carney | Aug. 17, 1943 |
| 2,548,332 | Alexander et al. | Apr. 10, 1951 |
| 2,561,771 | Ardern | July 24, 1951 |
| 2,642,343 | Studebaker | June 16, 1953 |
| 2,666,731 | Bergstrom | Jan. 19, 1954 |
| 2,704,228 | Thayer | Mar. 15, 1955 |
| 2,717,811 | Bergstrom | Sept. 13, 1955 |